United States Patent
Schmidl et al.

(10) Patent No.: US 6,970,495 B1
(45) Date of Patent: Nov. 29, 2005

(54) ADJUSTMENT OF SLAVE FREQUENCY HOPPING PATTERN TO IMPROVE CHANNEL MEASUREMENT OPPORTUNITIES IN WIRELESS COMMUNICATIONS

(75) Inventors: Timothy M. Schmidl, Dallas, TX (US); Anand G. Dabak, Plano, TX (US); Mohammed Nafie, Giza (EG); Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 592 days.

(21) Appl. No.: 09/634,053

(22) Filed: Aug. 8, 2000

Related U.S. Application Data

(60) Provisional application No. 60/181,391, filed on Feb. 9, 2000.

(51) Int. Cl.[7] .............................................. H04B 1/713
(52) U.S. Cl. ...................................... 375/132; 375/130
(58) Field of Search ................................ 375/132, 130, 375/131, 133, 134, 135, 136, 137; 370/278, 370/203, 208, 209, 320, 335, 342, 441, 479, 370/204; 445/452

(56) References Cited

U.S. PATENT DOCUMENTS

| | | | |
|---|---|---|---|
| 4,716,573 A | | 12/1987 | Bergström et al. |
| 5,459,760 A | * | 10/1995 | Watanabe .................... 375/134 |
| 5,491,727 A | * | 2/1996 | Petit ............................ 375/358 |
| 5,937,002 A | | 8/1999 | Anderson et al. |
| 6,275,500 B1 | * | 8/2001 | Callaway et al. ........... 370/449 |
| 6,341,145 B1 | * | 1/2002 | Hioe et al. ................... 375/256 |
| 6,400,751 B1 | * | 6/2002 | Rodgers ...................... 375/132 |
| 6,512,917 B1 | * | 1/2003 | Hiramatsu ................... 455/69 |
| 6,519,460 B1 | * | 2/2003 | Haartsen ...................... 455/452 |
| 6,567,459 B1 | * | 5/2003 | Hakkinen et al. ........... 375/132 |
| 6,600,726 B1 | * | 7/2003 | Nevo et al. .................. 370/278 |
| 6,603,799 B1 | * | 8/2003 | Hlasny ........................ 375/132 |

FOREIGN PATENT DOCUMENTS

| | | |
|---|---|---|
| EP | 1 130 858 A | 5/2001 |
| JP | 10 022877 A | 1/1998 |

OTHER PUBLICATIONS

"Networks for Homes", Amitava Dutta-Roy, Contributing Editor, IEEE Spectrum, Communications, Dec. 1999, pp. 26-33.

Abstract/Zusammenfassung/Abrege, 01200469.3.

* cited by examiner

*Primary Examiner*—Temesghen Ghebretinsae
*Assistant Examiner*—Sam K. Ahn
(74) *Attorney, Agent, or Firm*—Ronald O. Neerings; Wade James Brady, III; Frederick J. Telecky, Jr.

(57) ABSTRACT

The frequency hopping pattern of a first wireless communication device is modified such that each transmission (73) to a second wireless communication device is on a frequency ($MS_{j+1}$) that the second device's normal frequency hopping pattern specifies for one of the second device's next several transmissions to the first device. This permits the second device to make quality measurements (54) on a frequency that the second device will soon use (51) for transmission to the first device.

36 Claims, 3 Drawing Sheets

ADJUSTMENT OF SLAVE FREQUENCY HOPPING PATTERN TO IMPROVE CHANNEL MEASUREMENT OPPORTUNITIES IN WIRELESS COMMUNICATIONS

This application claims the priority under 35 U.S.C. 119(e)(1) of copending U.S. provisional application No. 60/181,391, filed on Feb. 9, 2000.

FIELD OF THE INVENTION

The invention relates generally to wireless communications and, more particularly, to wireless communications that utilize frequency hopping and make frequency channel measurements.

BACKGROUND OF THE INVENTION

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a $10^{th}$ century Scandinavian king who united several Danish kingdoms. This protocol also operates in the 2.4 GHz band and advantageously offers short-range wireless communication between Bluetooth devices without the need for a central network.

The Bluetooth protocol provides a 1 Mb/sec data rate with low energy consumption for battery powered devices operating in the 2.4 GHz ISM (industrial, scientific, medical) band. The current Bluetooth protocol provides a 10-meter range and an asymmetric data transfer rate of 721 kb/sec. The protocol supports a maximum of three voice channels for synchronous, CVSD-encoded transmission at 64 kb/sec. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scatternets." Typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Spread-spectrum technology or frequency diversity with frequency hopping permits operation in noisy environments and permits multiple piconets to exist in close proximity. The frequency hopping scheme permits up to 1600 hops per second over 79 1-MHZ channels or the entire ISM spectrum. Various error correcting schemes permit data packet protection by ⅓ and ⅔ rate forward error correction. Further, Bluetooth uses retransmission of packets for guaranteed reliability. These schemes help correct data errors, but at the expense of throughput.

The Bluetooth protocol is specified in detail in *Specification of the Bluetooth System*, Version 1.0A, Jul. 26, 1999, which is incorporated herein by reference.

Copending U.S. Ser. No. 09/489,668 filed on Jan. 24, 2000 (incorporated herein by reference) presents a Bluetooth system including a multi-antenna master which is operable to calculate weighting coefficients for its respective antennas based on channel measurements made on transmissions received by the respective antennas. These weighting coefficients are used by the master when transmitting via its plural antennas. In order to enhance the effectiveness of the calculated weighting coefficients, the master deviates from its normal frequency hopping pattern such that the transmit frequency from the master to a given slave is always the same as the transmit frequency that the slave last used to transmit to the master, which latter frequency is specified by the slave's normal frequency hopping pattern. In this manner, the master has an opportunity to measure the channel between the master and the slave at the same frequency that the master will soon use for its next transmission to that slave. This channel measurement opportunity soon before the next master transmission to the slave, and on the same frequency that the master will use in that transmission, increases the effectiveness of the calculated weighting coefficients that will be used in the transmission to the slave.

However, the fact that the master does deviate from its normal frequency hopping pattern in the above-described operation presents some disadvantages. For example, if the master wishes to address an ACL (Asynchronous Connection-Less) slave while using an SCO (Synchronous Connection-Oriented) link, the master would use the frequency dictated by its normal frequency hopping pattern, but the SCO slave would be listening on the frequency that it last used to transmit to the master. Accordingly, the SCO slave will not receive the expected packet, and will therefore respond with a negative acknowledgment (NAK in Bluetooth) indicating that the expected packet was not received. This negative acknowledgment will disadvantageously collide with the ACL slave's response to the master's transmission. A similar problem could arise if the master attempts to send an ACL broadcast packet on an SCO link.

It is therefore desirable to avoid the above-described collision problem while still providing the master with the aforementioned channel measurement opportunity.

The present invention avoids the above-described collision problem for SCO links by appropriately modifying the slave's frequency hopping pattern such that each slave-to-master transmission is on the same frequency that the master's normal frequency hopping pattern specifies for the master's next transmission (or for one of the master's next several transmissions) to that slave. In this manner, the aforementioned collision problem is avoided, because the master's normal frequency hopping pattern advantageously remains unchanged. Furthermore, the aforementioned channel measurement opportunity is retained, because the master still advantageously receives the slave's transmission on a frequency that the master will soon use for transmission to the slave.

DETAILED DESCRIPTION

Figure 1:
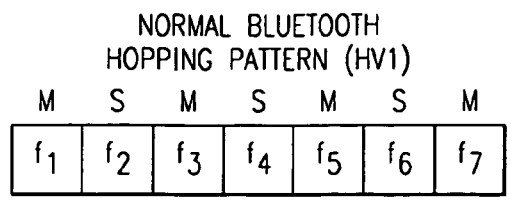
FIG. 1 diagrammatically illustrates one example of how a slave frequency hopping pattern can be modified according to the invention.
Figure 1:
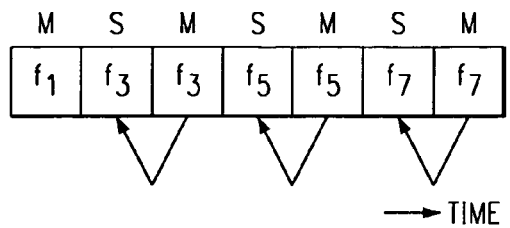

FIG. 1 diagrammatically illustrates one example of operations according to the present invention. The example of FIG. 1 relates to transmission of Bluetooth HV1 (High-quality Voice) packets between a master device M and a single slave device S. According to the invention, the slave device S transmits to the master M on the same frequency that the master will next transmit to the slave device according to the master's normal frequency hopping pattern. Thus, the master is advantageously given the opportunity to make channel measurements on frequencies $f_3$, $f_5$ and $f_7$ immediately before transmitting on those respective frequencies, but without requiring the master to deviate from its own normal frequency hopping pattern. Therefore, the slave S can listen for the master's transmission on the frequency specified by the master's normal frequency hopping pattern, thus permitting the master to transmit to an ACL slave (or to transmit an ACL broadcast packet) without the above-described collision problem.

Figure 2:
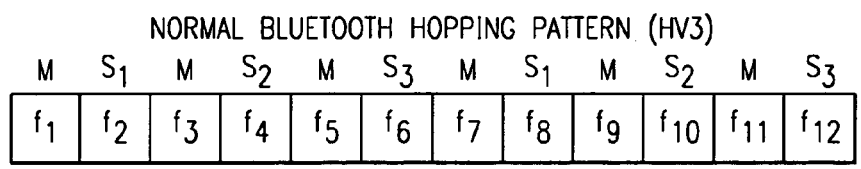
FIG. 2 diagrammatically illustrates another example of how a slave frequency hopping pattern can be modified according to the invention.
Figure 2:
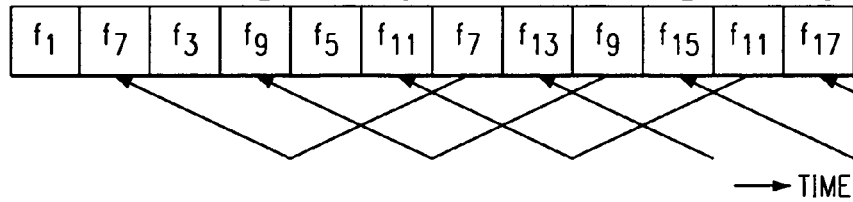

FIG. 2 illustrates another example of operations according to the present invention. FIG. 2 relates to transmission of Bluetooth HV3 packets between a master M and three slaves $S_1$, $S_2$ and $S_3$. In this example, each of the slaves transmits to the master on the same frequency that the master will use (as dictated by the master's normal frequency hopping pattern) on its next transmission to that particular slave. For example, after receiving a transmission from the master on $f_1$ the slave $S_1$ transmits to the master on frequency $f_7$, which is the frequency that the master will use (as specified by the master's normal frequency hopping pattern) for its next transmission to slave $S_1$. Accordingly, the master is given an opportunity to make measurements on the frequency (for example $f_7$) that it will soon (five time slots later in this example) use for transmission to the slave.

Figure 3:
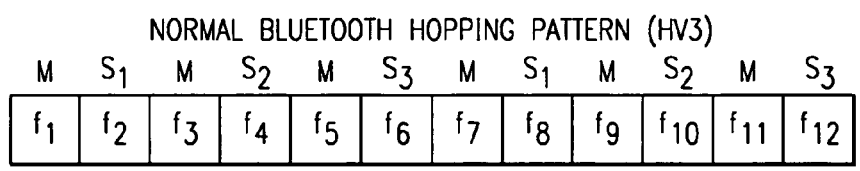
FIG. 3 diagrammatically illustrates a further example of how a slave frequency hopping pattern can be modified according to the invention.
Figure 3:
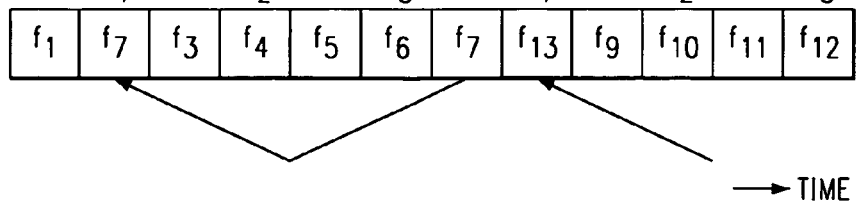

FIG. 3 illustrates a further example of operations according to the present invention. The example of FIG. 3 relates to transmission of Bluetooth HV3 packets between a master and three slaves $S_1$, $S_2$ and $S_3$. However, unlike the example of FIG. 2, only the frequency hopping pattern of slave $S_1$ is modified, the other two slave devices $S_2$ and $S_3$ retaining their normal frequency hopping patterns. Again, as shown in FIG. 3, the transmission from $S_1$ on $f_7$ gives the master M an opportunity to measure on the frequency that it will soon (five time slots later) use for transmission to slave $S_1$.

In each of the examples of FIGS. 1–3, the master M does not deviate from its normal frequency hopping pattern, but is still given an opportunity to make measurements on slave-to-master frequencies that it will soon use for master-to-slave transmissions. Thus, the master can calculate weighting coefficients that will provide meaningful control of near-future transmissions, while advantageously retaining the capability of addressing an ACL slave (or slaves) while using an SCO link. In the examples of FIGS. 1–3, a given slave transmits to the master on the frequency that the master is scheduled to use for its next transmission to that slave. However, the aforementioned meaningful measurement opportunity benefit of the invention can be realized so long as the slave transmits to the master on a frequency that is scheduled for one of the master's next several transmissions to the slave, for example one of the master's next ten transmissions to the slave.

Figure 4:
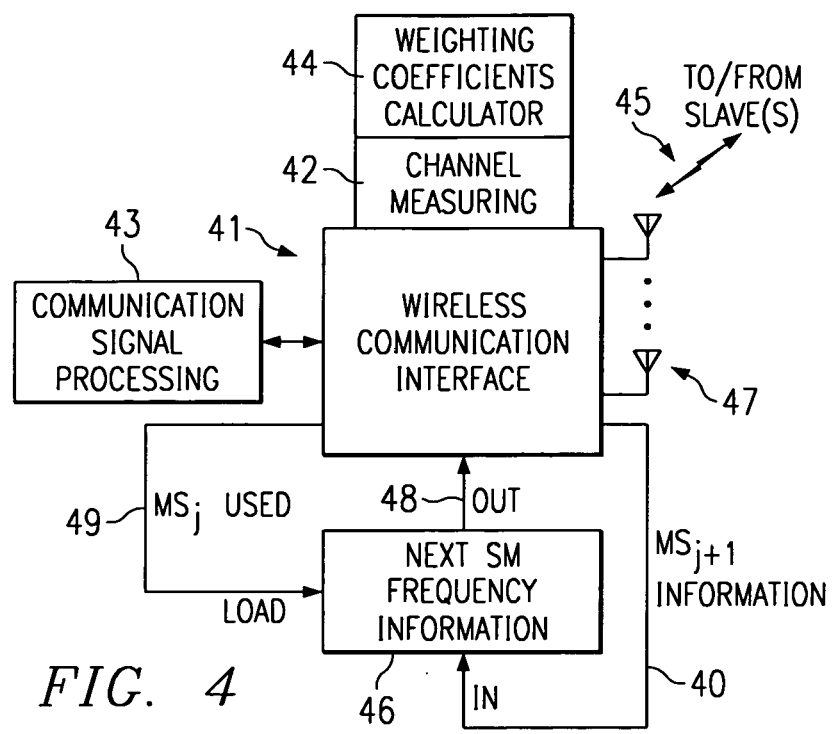
FIG. 4 diagrammatically illustrates pertinent portions of an exemplary embodiment of a master device according to the invention.

FIG. 4 diagrammatically illustrates pertinent portions of an exemplary embodiment of a (e.g., Bluetooth) master device according to the invention. Examples of the master device are mentioned above. The master device of FIG. 4 includes a wireless communications interface 41 coupled to a communication signal processing portion 43 for exchanging therewith communication information. The wireless communications interface 41 can use well-known conventional techniques to interface the communication signal processing portion 43 to a wireless communications link 45 (for example a Bluetooth radio link) via a plurality of antennas 47. The link 45 is used for bidirectional communications with one or more slave devices. The wireless communications interface 41 includes a channel measuring portion 42 which can perform conventional quality measurements on communications received via the respective antennas at 47. The wireless communications interface 41 further includes a weighting coefficients calculator 44 coupled to the channel measuring portion 42, and responsive to the conventional quality measurement information produced by the channel measuring portion 42 for calculating appropriate weighting coefficients associated with the respective antennas at 47 for use in transmissions to the slave device(s). As one example, if all but one weighting coefficient are zero, then only the antenna associated with the non-zero coefficient would be used for a transmission to the slave device.

The master device of FIG. 4 further includes a next slave-to-master (SM) frequency information register 46 for storing therein information indicative of the frequency that will be used for the next slave-to-master transmission. This register is an indicator of the next SM transmission frequency. The output 48 of register 46 makes this information available to the wireless communications interface 41. A load input 49 of the register 46 is coupled to the wireless communications interface 41 to receive therefrom an indication that the jth frequency in the master's normal transmit frequency hopping pattern has been used by the interface 41 to transmit a communication to the slave device. This jth master-to-slave frequency is designated herein as $MS_j$. The data input 40 of the register 46 is coupled to the wireless communications interface 41 to receive therefrom information indicative of the frequency that the master's normal transmit frequency hopping pattern specifies for the next (the (j+1)th) master-to-slave transmission. This frequency is designated herein as $MS_{j+1}$. Thus, as shown in FIG. 4, when the jth master-to-slave frequency $MS_j$ has been used to transmit to the slave, information indicative of the (j+1)th master-to-slave frequency $MS_{j+1}$ is loaded into the register 46. This information in register 46 indicates to the wireless communications interface 41 that the next slave-to-master frequency will be frequency $MS_{j+1}$ from the master's normal transmit frequency hopping pattern. Thus, the interface 41 will receive the next slave-to-master transmission on $MS_{+1}$.

Relating the example of FIG. 4 to the example of FIG. 1, $f_1$ in FIG. 1 corresponds to j=1 in FIG. 4, $f_3$ in FIG. 1 corresponds to j=2 in FIG. 4, $f_5$ in FIG. 1 corresponds to j=3 in FIG. 4, etc. Relating the example of FIG. 4 to slave $S_1$ in FIG. 2, $f_1$ in FIG. 2 corresponds to j=1 in FIG. 4, $f_7$ in FIG. 2 corresponds to j=2 in FIG. 4, etc. Relating FIG. 4 to slave $S_2$ in FIG. 2, $f_3$ in FIG. 2 corresponds to j=1 in FIG. 4, $f_9$ in FIG. 2 corresponds to j=2 in FIG. 4, etc. Relating FIG. 4 to slave $S_3$ in FIG. 2, $f_5$ in FIG. 2 corresponds to j=1 in FIG. 4, $f_{11}$ in FIG. 2 corresponds to j=2 in FIG. 4, etc. Relating FIG. 4 to slave $S_1$ of FIG. 3, $f_1$ in FIG. 3 corresponds to j=1 in FIG. 4, $f_7$ in FIG. 3 corresponds to j=2 in FIG. 4, etc. Thus, for a given slave, whenever the jth frequency for transmission to that slave has been used, information indicative of the (j+1)th frequency for transmission to that slave is loaded into register 46, thereby indicating that this (j+1)th frequency will be used for the next transmission from the slave to the master.

Figure 5:
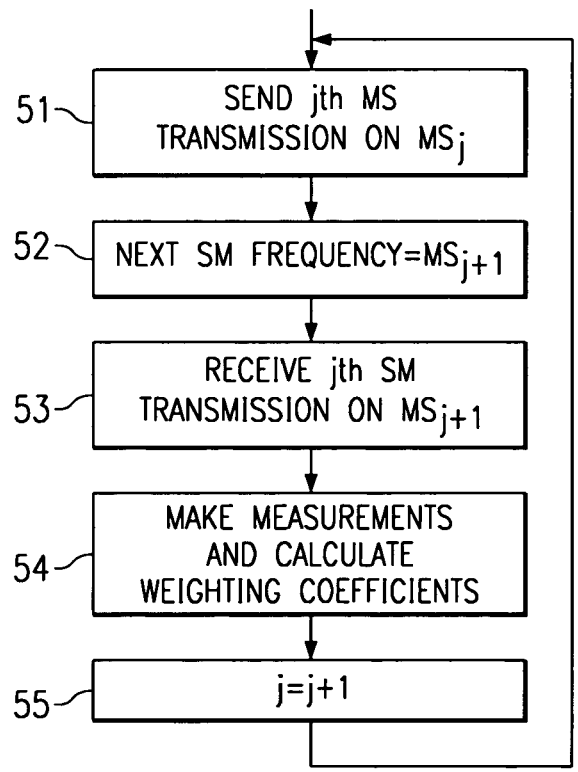
FIG. 5 illustrates exemplary operations which can be performed by the master device of FIG. 4.

FIG. 5 illustrates exemplary operations which can be performed by the master device of FIG. 4. At 51, the jth master-to-slave (MS) transmission is performed on frequency $MS_j$ (and using weighting coefficients for the respective master antennas). Thereafter at 52, frequency $MS_{j+1}$ is designated as the next slave-to-master frequency. Thereafter at 53, the jth SM transmission is received on frequency $MS_{j+1}$. At 54, channel measurements are made on the jth SM transmission (e.g., RSSI (received signal strength indicator), Bluetooth sync word correlation value), and weighting coefficients for use in the (j+1)th MS transmission are calculated based on the channel measurements. Thereafter, the index j is incremented at 55, and the above-described operations at 51–54 can be repeated.

Figure 6:
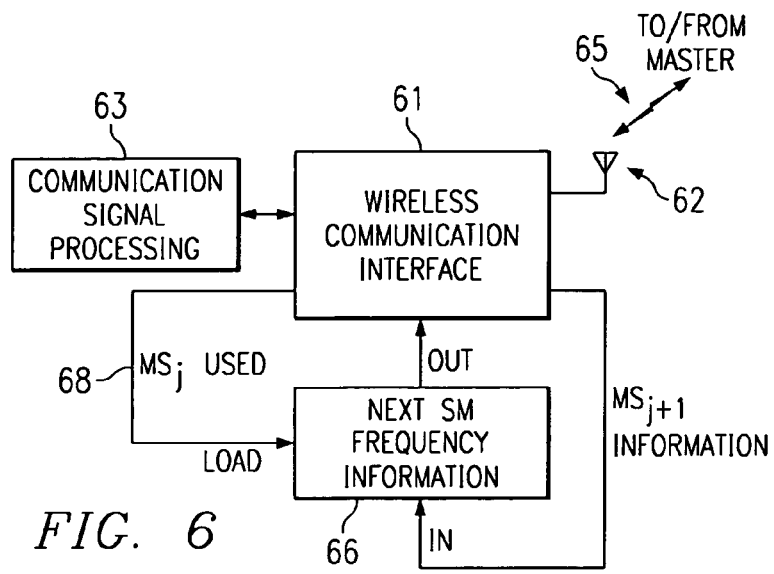
FIG. 6 diagrammatically illustrates pertinent portions of an exemplary embodiment of a slave device according to the invention.

FIG. 6 diagrammatically illustrates pertinent portions of an exemplary embodiment of a (e.g., Bluetooth) slave device according to the present invention. Examples of the slave device are mentioned above. The slave device of FIG. 6 includes a wireless communications interface 61 coupled for exchanging communication information with a communications signal processing portion 63. The wireless communications interface 61 interfaces the communications signal processing section 63 to a wireless communications link 65 via an antenna 62 for bidirectional wireless communications with a master device such as shown, for example, in FIG. 4. Similarly to the operation described above with respect to FIG. 4, when the wireless communications interface 61 indicates at 68 that the jth master-to-slave frequency $MS_j$ has been used by interface 61 to receive a communication from the master device, information indicative of the frequency $MS_{j+1}$ is loaded into a register 66, thereby indicating to the wireless communications interface 61 that frequency $MS_{j+1}$ from the master's normal transmit frequency hopping pattern is to be used by interface 61 for the next slave-to-master transmission. Thus, register 66 is an indicator of the next SM transmission frequency.

Figure 7:
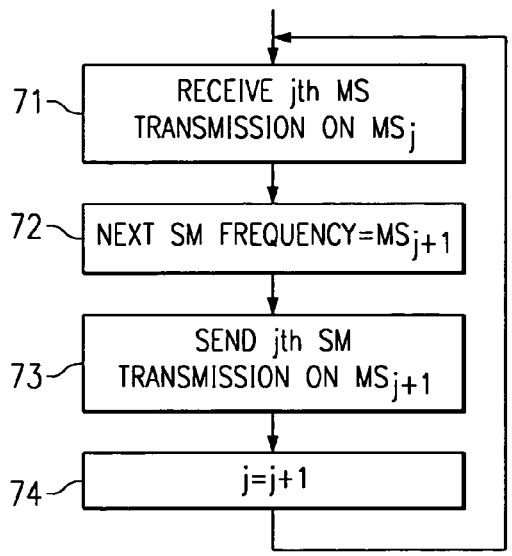
FIG. 7 illustrates exemplary operations which can be performed by the slave device of FIG. 6.

FIG. 7 illustrates exemplary operations which can be performed by the slave device of FIG. 6. At 71, the jth master-to-slave transmission is received on frequency $MS_j$. At 72, frequency $MS_{j+1}$ is designated as the next slave-to-master transmission frequency. At 73, the jth slave-to-master transmission is performed on frequency $MS_{j+1}$. After incrementing the index j at 74, the aforementioned operations at 71–73 can be repeated.

Figure 8:
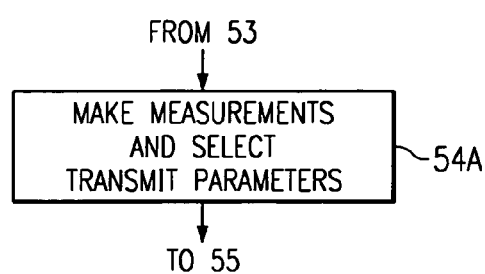
FIG. 8 illustrates further exemplary operations which can be performed by the master device of FIG. 4.

Referring again to FIG. 5, the quality measurements made at 54 can be used for purposes other than calculating weighting coefficients for multiple antennas, for example, selecting transmission parameters such as the channel coding rate (e.g., use higher coding rates in better quality conditions), the packet length (e.g., use longer packets in better quality conditions), and the transmission power level (e.g., use lower power in better quality conditions). This is shown generally at 54A in FIG. 8. It will be recognized that this type of transmit parameter selection operation is applicable even in devices that utilize only a single antenna, and the selection can be performed, for example, by the wireless communications interface 41 of FIG. 4.

It will be evident to workers in the art that the embodiments of FIGS. 1–8 can be implemented, for example, by suitable modifications in hardware, software, or a combination of hardware and software, in conventional frequency hopping wireless communication devices, for example Bluetooth master and slave devices.

Although exemplary embodiments of the invention are described above in detail, this does not limit the scope of the invention, which can be practiced in a variety of embodiments.

What is claimed is:

1. A method of controlling wireless communications between a first frequency hopping wireless communication device and a second frequency hopping wireless communication device, comprising:

the first device sending to the second device a first transmission on a first frequency specified by a frequency hopping pattern associated with transmissions by the second device, said first frequency specified by the frequency hopping pattern for one of a plurality of nearest future transmissions from the second device to the first device;

the second device receiving the first transmission and providing communication quality measurements respectively associated with receipt of the first transmission;

the second device sending a second transmission to a third device after said first transmission and before said one of the plurality of nearest future transmissions; and based on the communication quality measurements, the second device sending said one of the plurality of nearest future transmissions to the first device on the first frequency.

2. The method of claim 1, wherein said receiving step includes the second device receiving the first transmission via a plurality of antennas, said providing step includes providing communication quality measurements respectively associated with receipt of the first transmission by the respective antennas, and said sending step including using the antennas to send said one of the plurality of nearest future transmissions to the first device on the first frequency.

3. The method of claim 2, wherein said providing step further includes the second device calculating weighting coefficients for the respective antennas thereof based on the communication quality measurements.

4. The method of claim 3, wherein said using step includes the second device using the weighting coefficients to send said one of the plurality of nearest future transmissions.

5. The method of claim 2, including the second device selecting one of the antennas based on the communication quality measurements, and said sending step includes the second device using the selected antenna to send said one of the plurality of nearest future transmissions to the first device on the first frequency.

6. The method of claim 1, including the third device sending a third transmission to the second device after said first transmission and before said one of the plurality of nearest future transmissions.

7. The method of claim 6, including the second device sending a fourth transmission to a fourth device after said first transmission and before said one of the plurality of nearest future transmissions.

8. The method of claim 7, including the fourth device sending a fifth transmission to the second device after said first transmission and before said one of the plurality of nearest fixture transmissions.

9. The method of claim 8, wherein the first, third and fourth devices are Bluetooth slave devices and the second device is a Bluetooth master device.

10. The method of claim 6, wherein said step of the third device sending a transmission to the second device includes the third device sending the transmission to the second device on a second frequency specified by the frequency hopping pattern for one of a plurality of nearest future transmissions from the second device to the third device.

11. The method of claim 1, wherein said one of the plurality of nearest future transmissions is immediately timewise adjacent to said first transmission.

12. The method of claim 1, wherein the first device is a Bluetooth slave device and the second device is a Bluetooth master device.

13. The method of claim 1, wherein said sending step includes the second device changing one of a coding rate associated with said one transmission, a packet length associated with said one transmission and a transmission power level associated with said one of the plurality of nearest future transmissions, based on the communication quality measurements.

14. The method of claim 1, wherein said one of the plurality of nearest future transmissions is the nearest of said plurality of nearest future transmissions.

15. A frequency hopping wireless communication apparatus, comprising:
at least one antenna for transmitting and receiving communications via a wireless communication link;
a wireless communication interface coupled to said at least one antenna for receiving from a further frequency hopping wireless communication apparatus via said at least one antenna a first transmission on a first frequency specified by a frequency hopping pattern associated with transmissions by said wireless communication interface, said first frequency specified by the frequency hopping pattern for one of a plurality of nearest future transmissions to the further frequency hopping wireless communication apparatus;
wherein said wireless communication interface is operable after said first transmission and before said one of the plurality of nearest future transmissions for sending and receiving respective transmissions to and from a frequency hopping wireless communication apparatus other than the further frequency hopping wireless communication apparatus; and
said wireless communication interface including a measurement portion for providing communication quality measurements respectively associated with receipt of said first transmission by said at least one antenna, said wireless communication interface operable in response to receipt of said first transmission and based on said communication quality measurements for sending said one of the plurality of nearest future transmissions to the further frequency hopping wireless communication apparatus via said at least one antenna on said first frequency.

16. The apparatus of claim 15, including an indicator coupled to said wireless communication interface for indicating to said wireless communication interface that, after sending said one of the plurality of nearest future transmissions, a second frequency is to be used to receive a nearest future transmission from the further frequency hopping wireless communication apparatus, said second frequency specified by the frequency hopping pattern for a second transmission to the further frequency hopping wireless communication apparatus that is one of a plurality of transmissions to the further frequency hopping wireless communication apparatus that most closely follow said one of the plurality of nearest future transmission.

17. The apparatus of claim 15, wherein said one of the plurality of nearest future transmissions is immediately timewise adjacent said first transmission.

18. The apparatus or claim 15, provided as a Bluetooth master device.

19. The apparatus of claim 15, wherein said one of the plurality of nearest future transmissions is the nearest of said plurality of nearest future transmissions.

20. A frequency hopping wireless communication apparatus, comprising:
an antenna for transmitting and receiving communications via a wireless communication link;
a wireless communication interface coupled to said antenna for sending via said antenna to a further frequency hopping wireless communication apparatus a first transmission on a first frequency specified by a frequency hopping pattern associated with transmissions by the further frequency hopping wireless communication apparatus, said first frequency specified by the frequency hopping pattern for one of a plurality of nearest future transmissions from the further frequency hopping wireless communication apparatus to said wireless communication interface;
wherein said wireless communication interface is operable after said first transmission and before said one of the plurality of nearest future transmissions for sending and receiving respective transmissions to and from a frequency hopping wireless communication apparatus other than the further frequency hopping wireless communication apparatus; and
said wireless communication interface operable for receiving said one of the plurality of nearest future transmissions from the further frequency hopping wireless communication apparatus via said antenna on said first frequency, said nearest future transmission sent by the further frequency hopping wireless communication apparatus based on a plurality of communication quality measurements made by the further frequency hopping wireless communication apparatus and respectively associated with receipt of said first transmission by the further frequency hopping wireless communication apparatus.

21. The apparatus of claim 20, including an indicator coupled to said wireless communication interface for indicating to said wireless communication interface that, after receipt of said one of the plurality of nearest future transmissions, a second frequency is to be used to send a nearest future transmission from said wireless communication interface to the further frequency hopping wireless communication apparatus, said second frequency specified by the frequency hopping pattern for a second transmission from the further frequency hopping wireless communication apparatus to said wireless communication interface that is one of a plurality of transmissions from the further frequency hopping wireless communication apparatus to said wireless communication interface that most closely follow said one of the plurality of nearest future transmissions.

22. The apparatus of claim 20, wherein said nearest future transmission is immediately timewise adjacent to said first transmission.

23. The apparatus of claim 20, provided as a Bluetooth slave device.

24. The apparatus of claim 20, wherein said one of the plurality of nearest future transmissions is the nearest of said plurality of nearest future transmissions.

25. A method of controlling wireless communications, comprising:
determining a first frequency hopping pattern;
determining a second frequency hopping pattern different from the first frequency hopping pattern;
sending a first transmission on a first frequency of the first frequency hopping pattern from a first device to a second device, wherein the first frequency is specified by the second frequency hopping pattern for one of a plurality of nearest future transmissions from the second device to the first device;
receiving the first transmission and providing communication quality measurements at the second device; and
sending said one of the plurality of nearest future transmissions from the second device to the first device on the first frequency of the second frequency hopping pattern in response to the communication quality measurements.

26. A method as in claim 25, comprising sending a second transmission from the second device to a third device according to the second frequency hopping pattern after said first transmission and before said one of the plurality of nearest future transmissions.

27. A method as in claim 26, comprising:
determining a third frequency hopping pattern different from the first and second frequency hopping patterns; and
sending a third transmission from the third device to the second device according to the third frequency hopping pattern after said first transmission and before said one of the plurality of nearest future transmissions.

28. A method of controlling wireless communications, comprising:
determining a first frequency hopping pattern;
sending a first transmission on a first frequency of the first frequency hopping pattern from a first device to a second device;
receiving the first transmission and providing communication quality measurements at the second device;
determining a second frequency hopping pattern different from the first frequency hopping pattern;
selecting a channel coding rate in response to the communication quality measurements; and
sending one of the plurality of nearest future transmissions from the second device to the first device on the first frequency according to the second frequency hopping pattern in response to the step of selecting.

29. A method as in claim 28, comprising sending a second transmission from the second device to a third device according to the second frequency hopping pattern after said first transmission and before said one of the plurality of nearest future transmissions.

30. A method as in claim 29, comprising:
determining a third frequency hopping pattern different from the first and second frequency hopping patterns; and
sending a third transmission from the third device to the second device according to the third frequency hopping pattern after said first transmission and before said one of the plurality of nearest future transmissions.

31. A method of controlling wireless communications, comprising:
determining a first frequency hopping pattern;
sending a first transmission on a first frequency of the first frequency hopping pattern from a first device to a second device;
receiving the first transmission and providing communication quality measurements at the second device;
determining a second frequency hopping pattern different from the first frequency hopping pattern;
selecting a packet length in response to the communication quality measurements; and
sending one of the plurality of nearest future transmissions from the second device to the first device on the first frequency according to the second frequency hopping pattern in response to the step of selecting.

32. A method as in claim 31, comprising sending a second transmission from the second device to a third device according to the second frequency hopping pattern after said first transmission and before said one of the plurality of nearest future transmissions.

33. A method as in claim 32, comprising:
determining a third frequency hopping pattern different from the first and second frequency hopping patterns; and
sending a third transmission from the third device to the second device according to the third frequency hopping pattern after said first transmission and before said one of the plurality of nearest future transmissions.

34. A method of controlling wireless communications, comprising;
determining a first frequency hopping pattern;
sending a first transmission on a first frequency of the first frequency hopping pattern from a first device to a second device;
receiving the first transmission and providing communication quality measurements at the second device;
determining a second frequency hopping pattern different from the first frequency hopping pattern;
selecting a plurality of weighting coefficients in response to the communication quality measurements; and
transmitting over a plurality of antennas one of the plurality of nearest future transmissions from the second device to the first device on the first frequency according to the second frequency hopping pattern and the plurality of weighting coefficients corresponding to the plurality of antennas, respectively.

35. A method as in claim 34, comprising sending a second transmission from the second device to a third device according to the second frequency hopping pattern after said first transmission and before said one of the plurality of nearest future transmissions.

36. A method as in claim 35, comprising:
determining a third frequency hopping pattern different from the first and second frequency hopping patterns; and
sending a third transmission from the third device to the second device according to the third frequency hopping pattern after said first transmission and before said one of the plurality of nearest future transmissions.

* * * * *